UNITED STATES PATENT OFFICE.

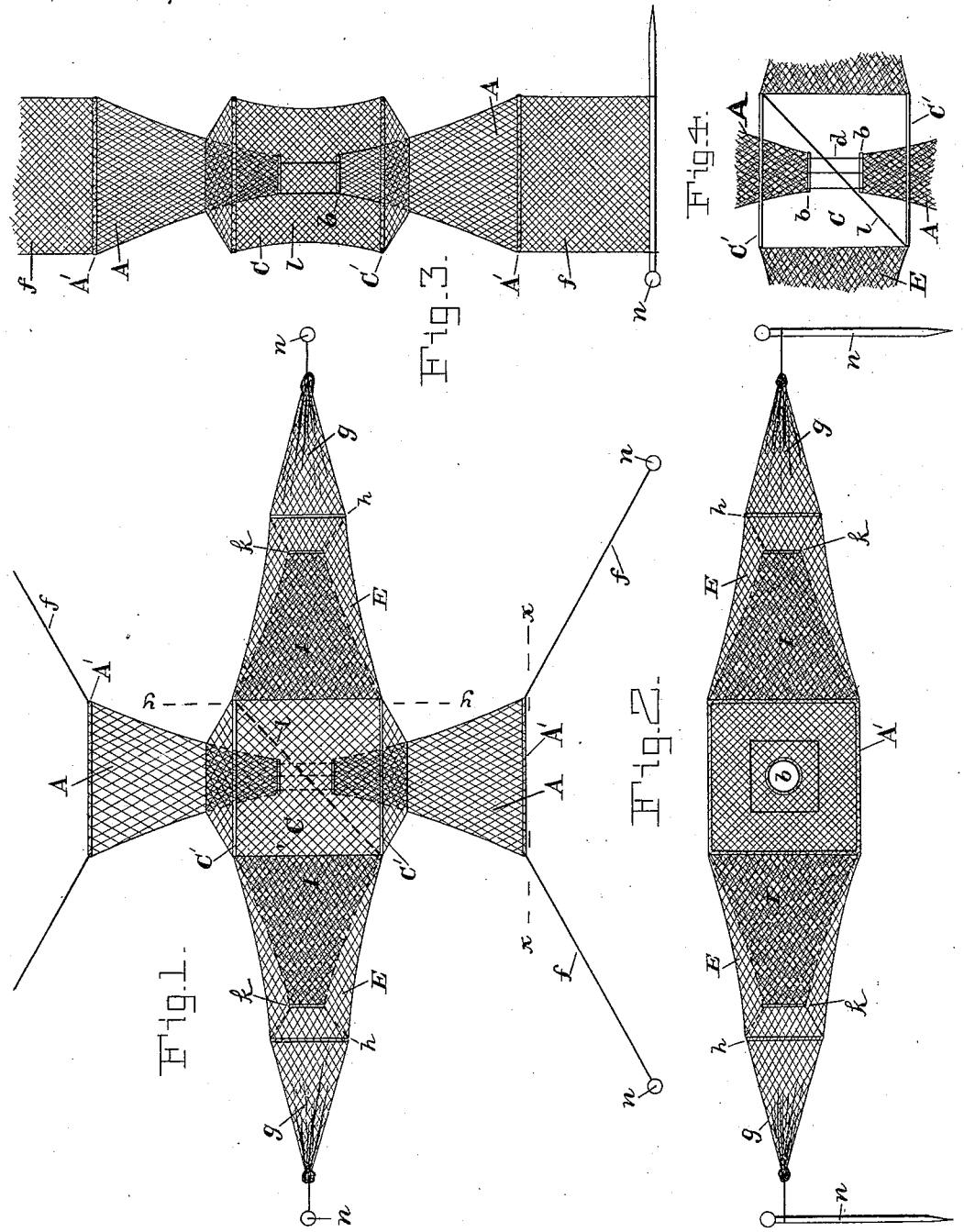

JOSEPH S. JOHNSON, OF BALTIMORE, MARYLAND.

FISH-TRAP.

SPECIFICATION forming part of Letters Patent No. 355,269, dated December 28, 1886.

Application filed May 17, 1886. Serial No. 202,349. (No model.)

*To all whom it may concern:*

Be it known that I, JOSEPH S. JOHNSON, a citizen of the United States, residing at Baltimore, in the State of Maryland, have invented certain new and useful Improvements in Fish Traps, of which the following is a specification.

This invention relates to a net-trap for fish and terrapins, and is illustrated in the accompanying drawings, in which—

Figure 1 is a plan view of the net-trap. Fig. 2 is a front elevation on the line $x\,x$. Fig. 3 is a side elevation in section on the line $y\,y$. Fig. 4 is a top view of the center part of the trap, in which the upper net-cover is removed for the purpose of more clearly showing the interior construction.

The trap has two fish-entrance funnels, A, the small ends of which have hoops $b$, and enter the center chamber, C, which latter, in the present instance, is square, though it may be of different shape—for instance, it may be triangular or hexagonal. When the center chamber, C, is square, the two entrance-funnels A preferably enter at opposite sides of said chamber, as shown in Fig. 1. If this chamber had a different shape, however, the entry point of the two funnels would still be at different sides, but not necessarily at opposite sides. In the drawings the funnels enter at opposite sides, and their small ends confront each other, with a space between, and cords $d$ extend from one hoop $b$ to the other and connect the two. In entering at opposite sides the small ends need not confront each other. The net at the large end of the fish-entrance funnels is stretched over a square hoop, A′, and the center chamber, C, is formed by square hoops C′. Hoops of this shape have several advantages over round ones. First, a net-trap made with square hoops will set and keep its position much better on the bottom of a stream or other body of water; second, the top and bottom are both alike and either may be set uppermost; and, third, this form of hoop facilitates the formation of a center chamber adapted to have connected with it two fish-entrance funnels, A. A wing, $f$, of well-known form may be attached. These wings, however, form no part of this invention, and may be dispensed with.

Two bags, E, are employed, and are attached to the center chamber, C, at opposite sides. In the drawings these bags taper and terminate in a gathered end or point, $g$, which is a well-known construction in fish-nets. The trapped fish are readily taken from this gathered end. Instead of a tapered end, $g$, the bags may have a square end. A stretcher-hoop, $h$, serves to keep the bag E distended or expanded. A bag-funnel, I, has its large end connected with the center chamber, C, and extends toward the point of the bag. Its small end is expanded by either a cord or a stiff hoop, $k$, and cords connect this small end with the stretcher-hoop $h$ on the bag. It will be seen the bag-funnel I has position at an angle with respect to the entrance-funnel A. This is an advantage, inasmuch as when the fish enter the center chamber they are at once diverted in a lateral direction, from whence their subsequent escape is more unlikely.

A diagonal partition, $l$, extends across the center chamber, C, and separates the confronting ends, $b$, of the two entrance-funnels. This partition prevents the fish which enter at one funnel from escaping by passing directly through the opposite entrance-funnel, and serves to divert the fish laterally to the bag-funnel. This partition may extend from top to bottom of the center chamber, or may merely extend across the confronting ends, $b$.

The trap is secured, as usual, by stakes, $n$.

It is not essential that the center chamber be covered.

This plan of trap is applicable for both fyke and pound nets.

A net-trap thus constructed has two bags and two entrances, and may be set in any desired position.

Having described my invention I claim, and desire to secure by Letters Patent of the United States—

1. A net-trap for fish, having a center chamber formed by square hoops C′ and netting stretched over said hoops, two fish-entrance funnels, the small ends of each of which enter said chamber at different sides, through the net-wall which is stretched over one of said square hoops, and said small ends confronting each other and connected by cords $d$, and a partition separating the said small ends, as set forth.

2. A trap for fish, made wholly of netting, having a center chamber, C, provided with a partition, $l$, extending across it, two entrance-funnels, the small ends of which enter said center chamber at different sides and are separated by the said partition, a bag, E, attached to the center chamber and projecting therefrom at an angle with respect to the entrance-funnels, and a bag-funnel, I, having its large end connected with the center chamber occupying the bag and extending toward the point or end of the latter, as set forth.

3. A trap for fish, made wholly of netting, having, in combination, a center chamber, C, two entrance-funnels which enter said chamber at different sides, a diagonal partition across the center chamber, separating the entrance or openings of said two funnels, and two bags each attached to the center chamber at an opposite side of the said diagonal partition, as set forth.

In testimony whereof I affix my signature in the presence of two witnesses.

JOSEPH S. JOHNSON.

Witnesses:
   JNO. T. MADDOX.
   JOHN E. MORRIS.